June 17, 1930. S. G. BAITS 1,763,739
POWER TRANSMITTING MECHANISM
Filed June 7, 1929
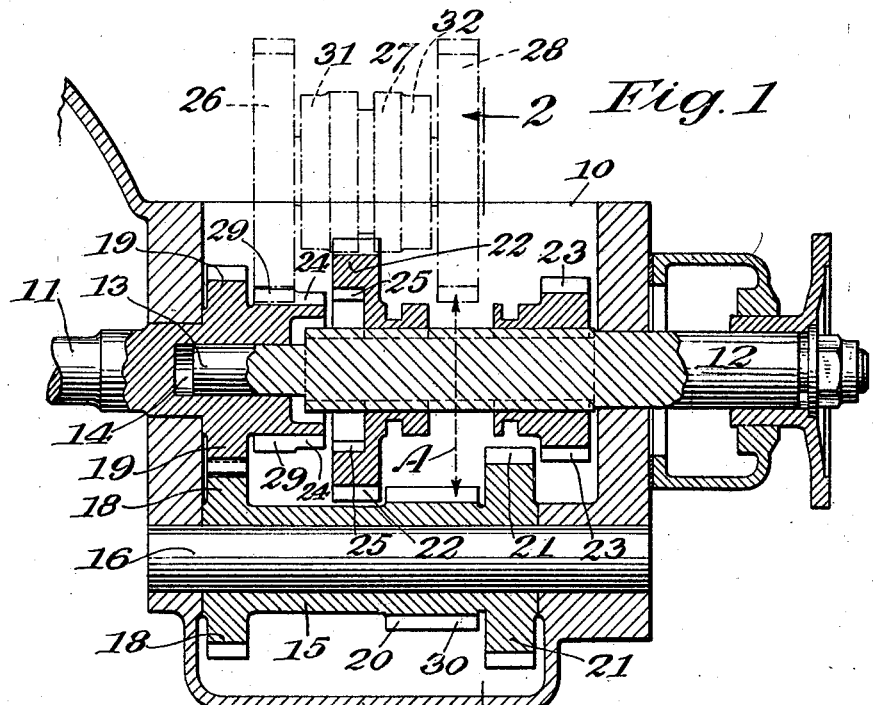
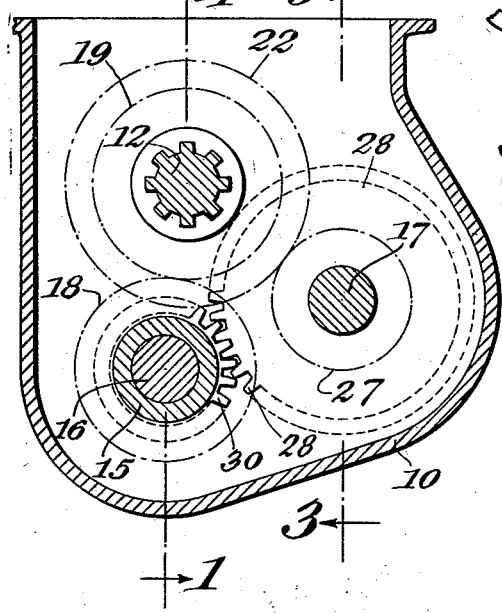
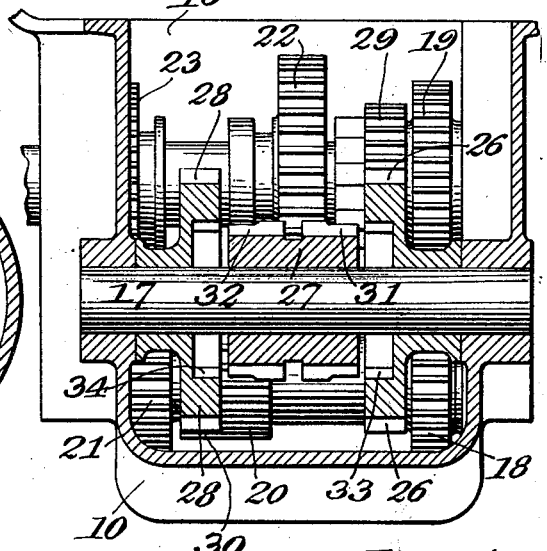
Inventor:
Stuart G. Baits,
By Macleod, Calver, Copeland & Dike,
Attorneys.

Patented June 17, 1930

1,763,739

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

POWER-TRANSMITTING MECHANISM

Application filed June 7, 1929. Serial No. 369,228.

This invention relates especially to automobile transmissions of the so-called four-speed type, that is to say, transmission mechanism adapted to be selectively adjusted to provide four forward speeds and a reverse drive.

Three-speed transmissions, that is to say, transmissions arranged to provide for three speeds forward and a reverse, have now become quite thoroughly standardized in the automotive arts. The present day demands for higher speeds, however, have called for the provision of gear ratios which will permit the car, under certain favorable conditions, to be driven at a greater speed than that provided for by the standard three-speed transmission without overspeeding the engine. Since relatively low speed gear ratios are required under certain driving conditions, the demand for higher speed provisions cannot be supplied merely by a change in the gear ratios of the standard three-speed transmission and can be successfully met only by a transmission of the four-speed type having a fourth forward speed, so as to provide a wider range of choice of gear ratios. Previous attempts to provide a satisfactory four-speed transmission have necessitated substantial changes in the standardized three-speed transmission, such as a material increase in the length of the transmission mechanism, the use of additional counter-shafts, or a resort to internal gearing which greatly complicates the construction.

The present invention has for its object to provide a simple four-speed transmission whose form and dimensions are substantially identical with those of the standard three-speed transmission and many of whose parts are interchangeable therewith, and in which the necessity of resorting to additional countershafts or to internal gearing is avoided.

The more particular objects of the invention, together with means whereby the latter may be carried into effect, will best be understood from the following description of a preferred embodiment thereof illustrated in the accompanying drawings. It will be understood however that the particular construction and arrangement described and shown have been chosen for purposes of exemplification merely, and that the invention, as defined by the claims hereunto appended, may be otherwise embodied without departure from the spirt and scope thereof.

In said drawings:

Fig. 1 is a longitudinal vertical section, taken substantially on the line 1—1, Fig. 2, of a transmission embodying the invention, certain of the parts in the rear of the plane of the section being shown in broken lines at the top of the figure.

Fig. 2 is a vertical transverse section taken substantially on the line 2—2, Fig. 1.

Fig. 3 is a longitudinal vertical section taken substantially on the line 3—3, Fig. 2.

In the drawings, 10 denotes the transmission casing which may be provided with a suitable cover (not shown) and which is of a suitable size and shape to enclose the mechanism and to provide the necessary supports and bearings for the various parts thereof. As shown, said casing is substantially identical in form and dimensions with the casing employed in connection with a well known design of three-speed transmission.

11 denotes the driving shaft and 12 the driven shaft journalled respectively in suitable bearings in the front and rear walls of the casing and coaxially disposed so as to form, in effect, a continuous shaft, said driven shaft having a reduced forward end 13 journalled in an axial recess 14 in the rear end of the driving shaft 11. Disposed below the coaxial driving and driven shafts and parallel thereto is a jack shaft or countershaft, herein shown as comprising a sleeve 15 rotatably mounted on an arbor 16 supported at its ends in the front and rear walls of the casing 10, said sleeve having fast thereon or formed integral therewith certain gears hereinafter referred to. In addition to the shafts above referred to, a third shaft, which, for convenience, may be designated the reverse shaft, is disposed with its axis likewise parallel to that of the driving and driven shafts, but at one side thereof. As shown, said reverse shaft comprises an arbor 17 supported at its ends in the front and rear walls of the casing 10, said reverse shaft occupying the position of, although being slightly longer than, the usual stud for rotatably supporting the necessary reversing pinion commonly employed in a standard three-speed transmission for producing the reverse drive.

As in the standard three-speed transmission, the countershaft 15 is driven from the driving shaft 11 through a gear 18 on said countershaft in constant mesh with a gear 19 fast on the driving shaft and is also provided with additional gears 20 and 21 into mesh with which gears 22 and 23 slidably splined on the driven shaft 12 may be selectively moved. Also as in the standard three-speed transmission, the driving shaft and driven shaft are provided with the coacting elements 24 and 25 of a clutch, whereby said shafts may be directly connected for rotation in unison, the clutch element 25 being associated with the gear 22.

In accordance with the present invention, the reverse shaft 17 has loose thereon three gears 26, 27 and 28, the gear 27 being located between the gears 26 and 28. The gear 26 is in constant mesh with a gear 29 on the driving shaft 11, said gear 29 being preferably formed integral with said shaft and with the gear 19 and clutch element 24. The gear 27 meshes with the gear 22 on the driven shaft 12, having a face of sufficient width to maintain said gears in constant engagement notwithstanding their longitudinal shifting on their respective shafts, as hereinafter described. The gear 28, as indicated by the arrow A on Fig. 1, is in constant mesh with a gear 30 on the countershaft, said gear 30 being conveniently formed as a longitudinal elongation of the gear 20. The gear 27 is formed adjacent its opposite ends with clutch elements 31 and 32 adapted to coact respectively with clutch elements 33 and 34 formed in the gears 26 and 28, said gear 27 being movable in opposite directions from the central neutral position shown to clutch the same to the gears 26 and 28 alternatively.

The gears 22, 23 and 27 may be selectively moved longitudinally of their respective shafts, to provide the several driving connections, by forks carried by shifter slides operated by the usual gear shift lever. Such parts being well known in the art are not illustrated herein.

While the particular drives afforded by the several connections above described will depend upon the particular gear ratios adopted and may be varied widely to suit the requirements, the provisions and operation of the construction and arrangement herein shown are as follows. In the drawings the shiftable parts are all shown in their respective neutral positions, leaving the driven shaft 12 disconnected from the driving shaft 11.

To connect the parts for the first or low speed drive, the gear 27 is moved toward the left in Fig. 1, or toward the right in Fig. 3, thereby engaging the clutch elements 31 and 33 and operatively connecting said gear 26 with the gear 27. The driven shaft 12 will then be driven from the driving shaft 11 independently of the countershaft through the gears 29, 26, 27 and 22.

The parts are connected for the second speed drive by moving the gear 22 toward the right from its neutral position shown in Fig. 1 into mesh with the gear 20 on the countershaft 15. The driven shaft 12 will then be driven from the driving shaft 11 through the gears 19 and 18, countershaft 15, and gears 20 and 22.

The third speed, which, in the present instance, is the direct drive, is effected by moving the gear 22 toward the left from the neutral position shown, thereby engaging the clutch elements 25 and 24 whereupon the driven shaft 12 is directly coupled to the alined driving shaft 11 for rotation in unison therewith.

The fourth speed, which, in the present instance, is an overdrive, is effected by moving the gear 23 longitudinally of the shaft 12 toward the left in Fig. 1 into mesh with the gear 21. The driven shaft 12 is then driven from the driving shaft 11, and at a greater speed, through the gears 19 and 18, countershaft 15, and gears 21 and 23.

The reverse drive is effected by moving the gear 27 from its neutral position shown toward the right in Fig. 1, or toward the left in Fig. 3, thereby engaging the clutch elements 32 with the clutch elements 34 and operatively connecting the gear 27 with the gear 28. The driven shaft 12 will then be driven in a reverse direction from the driving shaft 11 through the gears 19 and 18, countershaft 15, and gears 30, 28, 27 and 22.

What I claim is:

1. In a power transmitting mechanism, in combination, coaxial driving and driven shafts, a countershaft and a reverse shaft both parallel to said driving and driven shafts, gears on said driving shaft, driven shaft, and countershaft including coacting gears whereby said countershaft may be driven from said driving shaft and coacting gears whereby said driven shaft may be driven from said counter shaft, a gear on said reverse shaft coacting with a gear on said driving shaft, a second gear on said reverse shaft coacting with a gear on said countershaft, a third gear on said reverse shaft coacting with a gear on said driven shaft, and means for operatively connecting said third gear alternatively with said first and second named gears on said reverse shaft, whereby said driven shaft may be driven from said driving shaft either in a forward direction independently of said countershaft through said first and third named gears or in a reverse direction through said countershaft and said second and third named gears.

2. In a power transmitting mechanism, in combination, coaxial driving and driven shafts, a countershaft and a reverse shaft both parallel to said driving and driven shafts, gears on said driving shaft, driven shaft, and countershaft including coacting gears whereby said countershaft may be driven from said driving shaft and coacting gears whereby said driven shaft may be driven from said countershaft, a gear loose on said reverse shaft and in constant mesh with a gear on said driving shaft, a second gear loose on said reverse shaft and in constant mesh with a gear on said countershaft, a third gear loose on said reverse shaft and in constant mesh with a gear on said driven shaft, and means for operatively connecting said third gear alternatively with said first and second named gears on said reverse shaft, whereby said driven shaft may be driven from said driving shaft either in a forward direction independently of said countershaft through said first and third named gears or in a reverse direction through said countershaft and said second and third named gears.

3. In a power transmitting mechanism, in combination, coaxial driving and driven shafts, a countershaft and a reverse shaft both parallel to said driving and driven shafts, gears on said driving shaft, driven shaft, and countershaft including coacting gears whereby said countershaft may be driven from said driving shaft and coacting gears whereby said driven shaft may be driven from said countershaft, a gear on said reverse shaft coacting with a gear on said driving shaft, a second gear on said reverse shaft coacting with a gear on said countershaft, and a third gear on said reverse shaft coacting with a gear on said driven shaft, said third gear being located between said first and second named gears, having means for clutching engagement therewith, and being movable in opposite directions from a central neutral position to clutch the same to said first and second named gears alternatively, whereby said driven shaft may be driven from said driving shaft either in a forward direction independently of said countershaft through said first and third named gears or in a reverse direction through said countershaft and said second and third named gears.

4. In a power transmitting mechanism, in combination, coaxial driving and driven shafts, a countershaft and a reverse shaft both parallel to said driving and driven shafts, a clutch for directly connecting said driving and driven shafts for rotation in unison, constantly meshing gears on said driving shaft and countershaft, other gears on said countershaft, gears on said driven shaft selectively movable into mesh with said other gears, one of said driven shaft gears having associated therewith one of the elements of said clutch, a gear loose on said reverse shaft in constant mesh with said last named driven shaft gear, additional gears loose on said reverse shaft and located at opposite sides respectively of said first named reverse shaft gear and gears on said driving shaft and countershaft in constant mesh with said additional gears respectively, said first named reverse shaft gear having means for clutching engagement with said additional gears and being movable in opposite directions from a central neutral position to clutch the same to said additional gears alternatively.

In testimony whereof I affix my signature.

STUART G. BAITS.